United States Patent
Battheu

(10) Patent No.: US 8,440,932 B2
(45) Date of Patent: May 14, 2013

(54) MANIPULATOR AT LOW INERTIA FOR LASER CUTTING MACHINES FOR FLAT SHEET METALS

(75) Inventor: Claude Battheu, Bolzano (IT)

(73) Assignee: Salvagnini Italia S.p.A., Sarego (VI) (IT)

( * ) Notice: Subject to any disclaimer, the term of this patent is extended or adjusted under 35 U.S.C. 154(b) by 290 days.

(21) Appl. No.: 12/838,548

(22) Filed: Jul. 19, 2010

(65) Prior Publication Data

US 2011/0017714 A1    Jan. 27, 2011

(30) Foreign Application Priority Data

Jul. 27, 2009   (IT) .............................. MI2009A1324

(51) Int. Cl.
*B23K 26/38* (2006.01)
*B23K 26/30* (2006.01)

(52) U.S. Cl.
USPC .................................................... 219/121.67

(58) Field of Classification Search ............. 219/121.67, 219/121.78, 121.79, 121.82, 124.31
See application file for complete search history.

(56) References Cited

U.S. PATENT DOCUMENTS

| | | | |
|---|---|---|---|
| 5,378,282 A | 1/1995 | Pollard | |
| 5,900,171 A | 5/1999 | Karube et al. | |
| 6,428,453 B1 | 8/2002 | Hoppe et al. | |
| 7,538,296 B2 * | 5/2009 | Elfizy | 219/121.71 |
| 2001/0006595 A1 | 7/2001 | Hogl et al. | |
| 2004/0025761 A1 | 2/2004 | Sartorio | |
| 2005/0129495 A1 | 6/2005 | Brogardh | |
| 2008/0197118 A1 | 8/2008 | Gattiglio et al. | |
| 2010/0089878 A1 * | 4/2010 | Halser | 219/121.39 |
| 2012/0097652 A1 * | 4/2012 | Battheu | 219/121.67 |

FOREIGN PATENT DOCUMENTS

| | | |
|---|---|---|
| DE | 19525482 | 1/1997 |
| EP | 1366846 | 12/2003 |
| FR | 2800659 A1 | 5/2001 |
| JP | 07214359 | 8/1995 |

OTHER PUBLICATIONS

European Search Report, Completed Nov. 2, 2010 by the European Patent Office, for European Patent Application No. EP 10 16 9263.0.

* cited by examiner

*Primary Examiner* — William D Coleman
(74) *Attorney, Agent, or Firm* — Novak Druce Connolly Bove + Quigg LLP

(57) ABSTRACT

A manipulator at low inertia for laser cutting machines of flat sheet metals is described, which comprises a longitudinal movement axis X and a transversal movement axis Y perpendicular to said longitudinal axis and parallel to the plane of the sheet metal, and a supporting equipment (15) for a laser cutting head (14) which is displaceable along said axes. The supporting equipment (15) comprises two sliding blocks (5, 6) driven by respective independent actuators (7, 8) to move along the axis Y at a variable mutual distance, and rods (9, 10) for the articulated connection of said sliding blocks (5, 6) to said laser cutting head (14).

4 Claims, 8 Drawing Sheets

MANIPULATOR AT LOW INERTIA FOR LASER CUTTING MACHINES FOR FLAT SHEET METALS

CROSS-REFERENCE TO RELATED APPLICATIONS

This application claims priority to Italian Patent Application MI2009A001324, filed Jul. 27, 2009, the entire contents of which are incorporated herein by reference.

FIELD OF THE INVENTION

The present invention relates to a manipulator at low inertia for laser cutting machines for flat sheet metals.

BACKGROUND OF THE INVENTION

The most common model of laser cutting machine for flat sheet metals is that having moving optics and a fixed piece. In such a machine model, the sheet being processed is arranged on a plane while the cutting tool (focusing head) is moving along movement axes X-Y perpendicular to each other and parallel to the plane of the sheet, by means of suitable CNC actuators. Generally, the first axis (X) is that with the longest stroke and is made with a gantry resting on two parallel guides or on a single guide with a cantilever. The second orthogonal axis (Y) is generally mounted to the first. The total mass of the moving equipments along the two axes thus conceived is generally rather significant, despite being in line with the task.

The flat laser cutting profiles generally comprise a multitude of small winding movements which, to be travelled with sufficient accuracy, require the adoption of limited dynamics which are reflected in a lower machine productivity. The dynamics (maximum accelerations) are limited due to the masses involved. The structure having a central beam, used as a middle way between the gantry and cantilever solutions, is also affected by this problem. In other words, the masses of the system of Cartesian axes X-Y and the accelerations required to cut contours with small curvature radiuses at the processing speed, are against the current trend. We point out that the acceleration while bending is $v^2/r$, where "v" is the specific laser cutting processing speed and "r" is the curvature radius of the cutting profile in progress. If "r" is small, then the acceleration becomes high and the processing speed "v" should be reduced to obtain a quality processing.

A first solution adapted to overcome the afore-described limit was achieved by adding a second system of auxiliary Cartesian axes xy, with reduced masses and strokes, mounted on the first system of main axes XY (patent US 2004/0025761). In a work cycle; a few long-pitch movements are made with the main axes XY and many local movements having a short pitch and high dynamics are made with the pair of auxiliary Cartesian axes xy (solution XY+xy).

An alternative solution was then devised and described in EP1366846 using a single additional, linear auxiliary axis x mounted on the transversal axis Y, in turn upheld by the main gantry X. The dominating mass is that of the main gantry X while the small mass is given by the transversal axis Y and the auxiliary x. The wide, rare movements are performed with the axis of the main gantry X while the local, frequent movements having high dynamics are performed with the pair of axes Yx (X+Yx solution).

A further alternative solution came out with US 2008/0197118, which substitutes the additional Cartesian system xy at low inertia with a polar positioning mechanism "ρΘ" operated by two motorized slides of adjustable length which extend towards the cutting head from a common motorized carriage which is slidable along the axis Y. The wide, rare movements are performed with the gantry axis X while the local, frequent movements having high dynamics are performed with the combination of the three axes YρΘ (X+YρΘ solution).

SUMMARY OF THE INVENTION

The object of the present invention is to provide a further alternative solution which mixes the two aforementioned solutions and allows to increase the work performances of the machine while ensuring the cutting quality of the piece.

In accordance with the present invention, said object has been achieved by a manipulator for laser cutting machines for flat sheet metals, comprising a longitudinal movement axis X and a transversal movement axis Y perpendicular to said longitudinal axis and parallel to the plane of the sheet metal, and a supporting equipment for a laser cutting head which is displaceable along said axes, characterized in that said supporting equipment comprises two sliding blocks driven by respective independent actuators to move along the axis Y at a variable mutual distance, and rods for the articulated connection of said sliding blocks to said laser cutting head.

A first actuator provides the transversal mobility along the axis Y and the second actuator collaborates with the first and with the articulated connection rods to add an angular mobility Θ having a constant radius, to the laser cutting head; the combination of the two motions provides the local Cartesian coverage required. The wide, rare movements are performed with the axis X while the local, frequent movements having high dynamics are performed with the pair of axes YΘ(X+YΘ solution).

The advantage offered by the present invention is to increase the work performances of the machine while ensuring the cutting quality of the piece with a local moving system at low inertia which only uses two local actuators instead of three as used by the solutions US 2004/0025761 and US 2008/0197118. The solution EP 1366846, with two local actuators, differs in turn from the present invention due to the positioning modes at low inertia operated as a combination of linear and polar motions.

The low inertia motion actuators may be indifferently made with any of the known motorizations, e.g. by means of leadscrew with recirculating balls, pinion-rack drive, or slides with linear motors.

BRIEF DESCRIPTION OF THE DRAWINGS

The features of the present invention will become increasingly apparent from the following detailed description of a laser cutting machine with a manipulator at low inertia, which is shown by way of non-limiting example in the accompanying drawings, in which:

FIG. 1 shows a laser cutting machine of the type with end portals 1 and central longitudinal beam 2 connecting the two portals.

Figure 7:
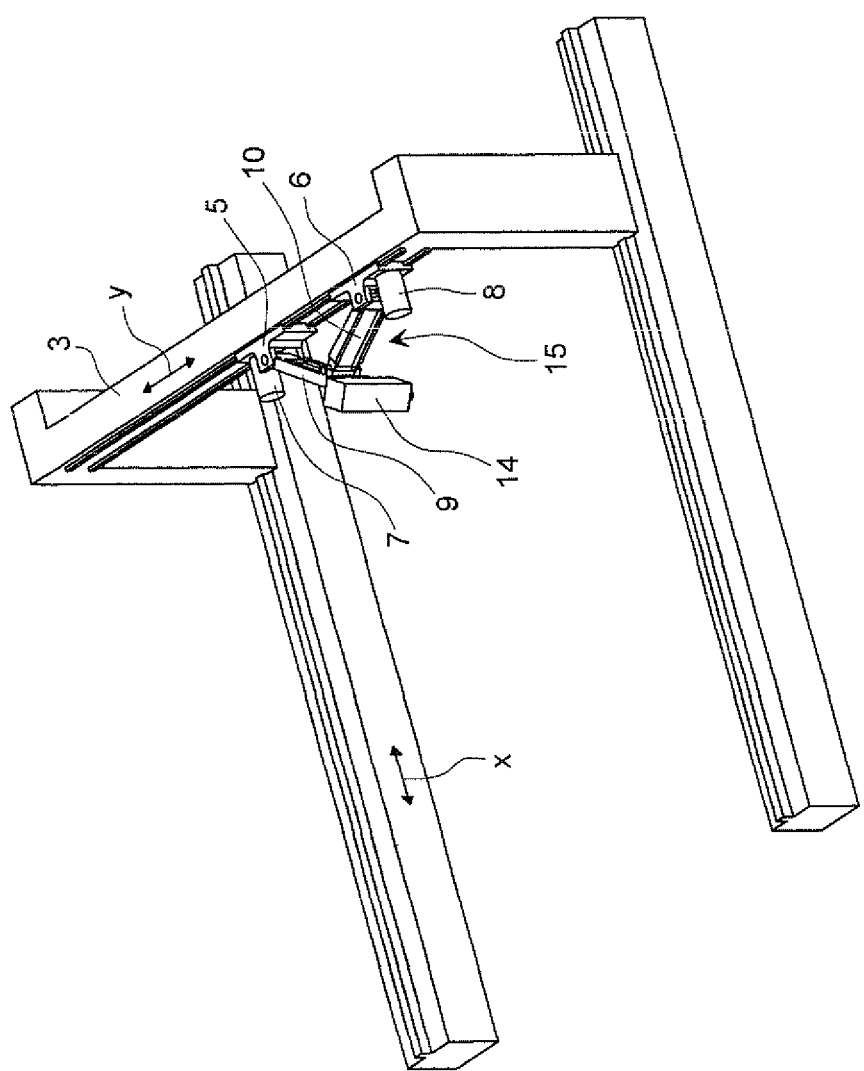
FIGS. 7 and 8 show further examples of machines using the manipulator according to the present invention.
Figure 8:
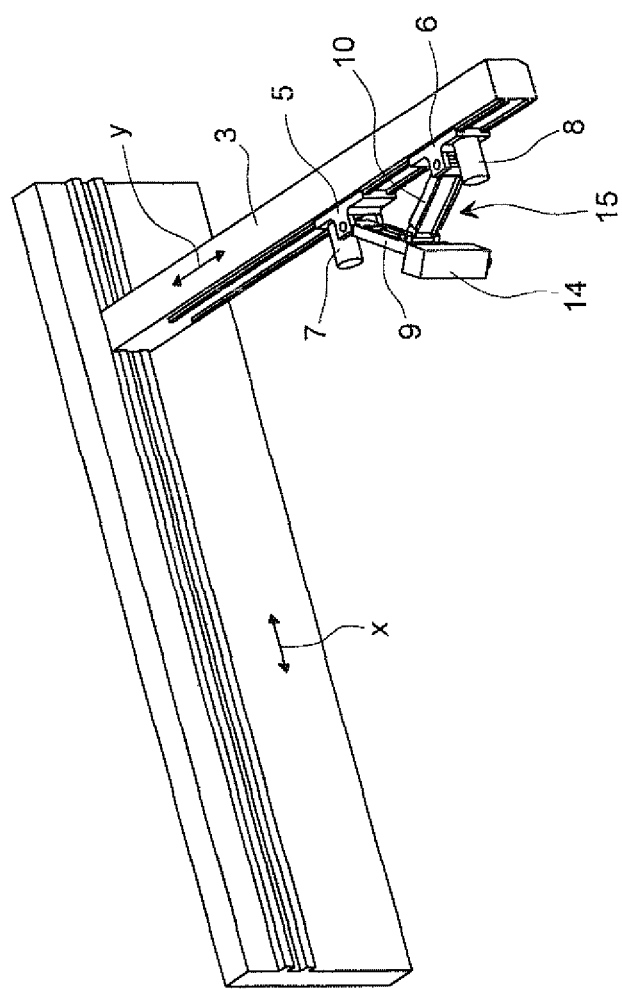

Alternatively a gantry (FIG. 7) or cantilever (FIG. 8) structure may be provided.

DETAILED DESCRIPTION

Figure 1:
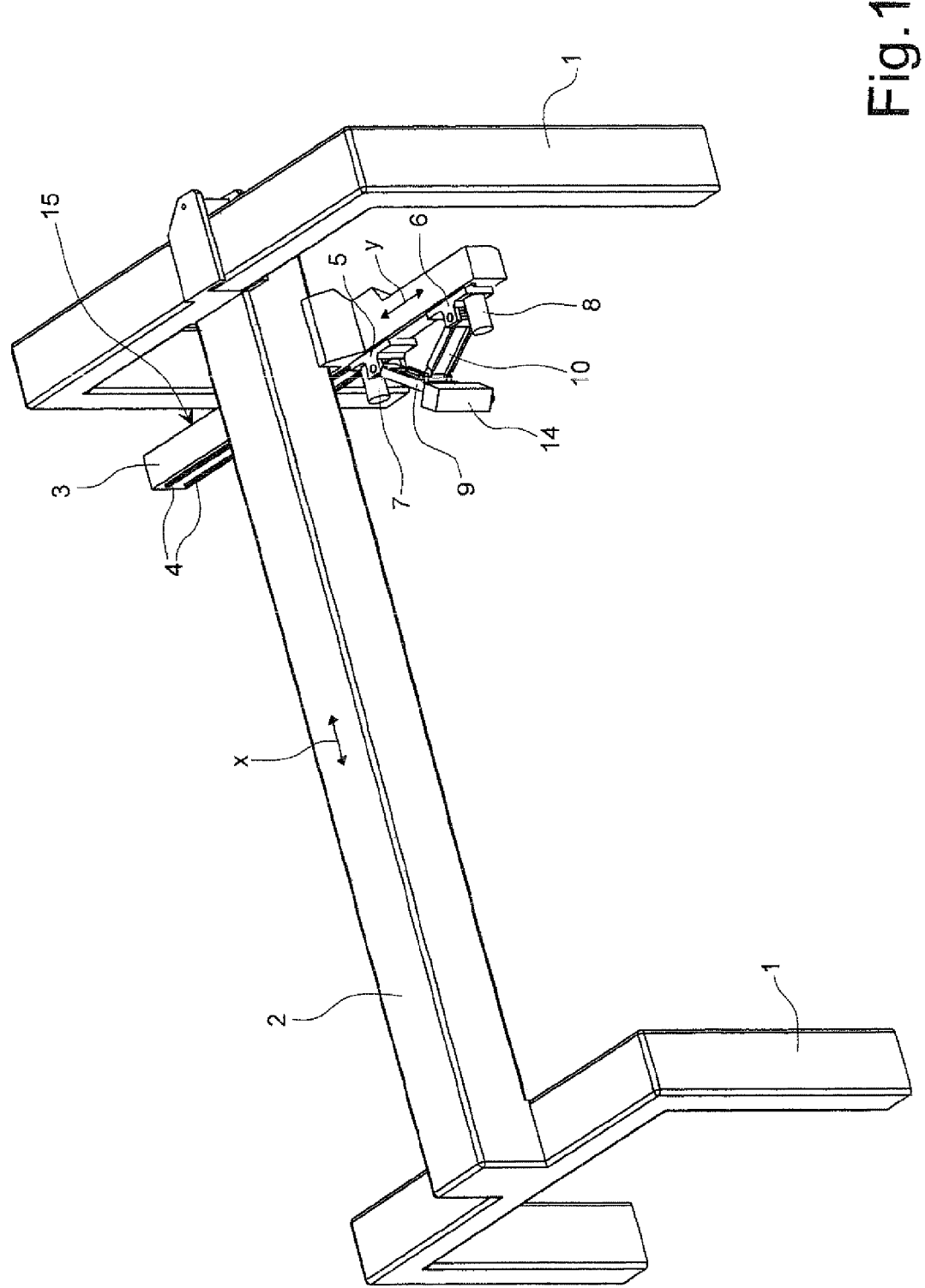
FIG. 1 shows an example of a laser cutting machine having two dimensions which uses a manipulator with axes X+YΘ according to the present invention.

In the example in FIG. 1, the central beam 2 (axis X) supports a crossbeam 3 which may longitudinally slide along the beam 2 due to a main actuator (not shown). The actuator may be of any type, having a slide with linear motor, pinion-rack drive or leadscrew with recirculating balls.

Figure 2:
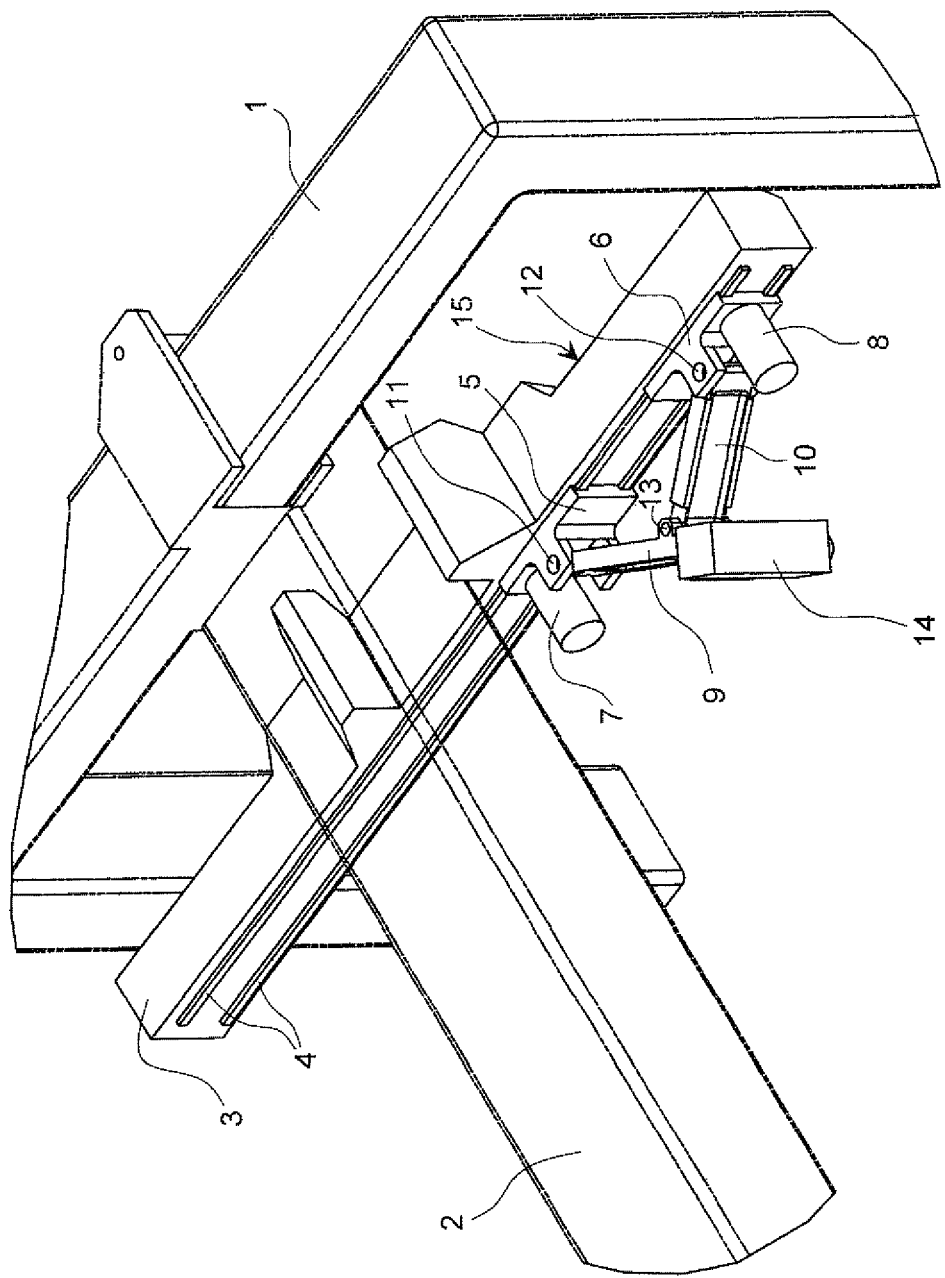
FIG. 2 shows the enlarged detail of the manipulator with the two sliding support blocks of the laser cutting head in a position of maximum mutual distance at one end of axis Y.
Figure 3:
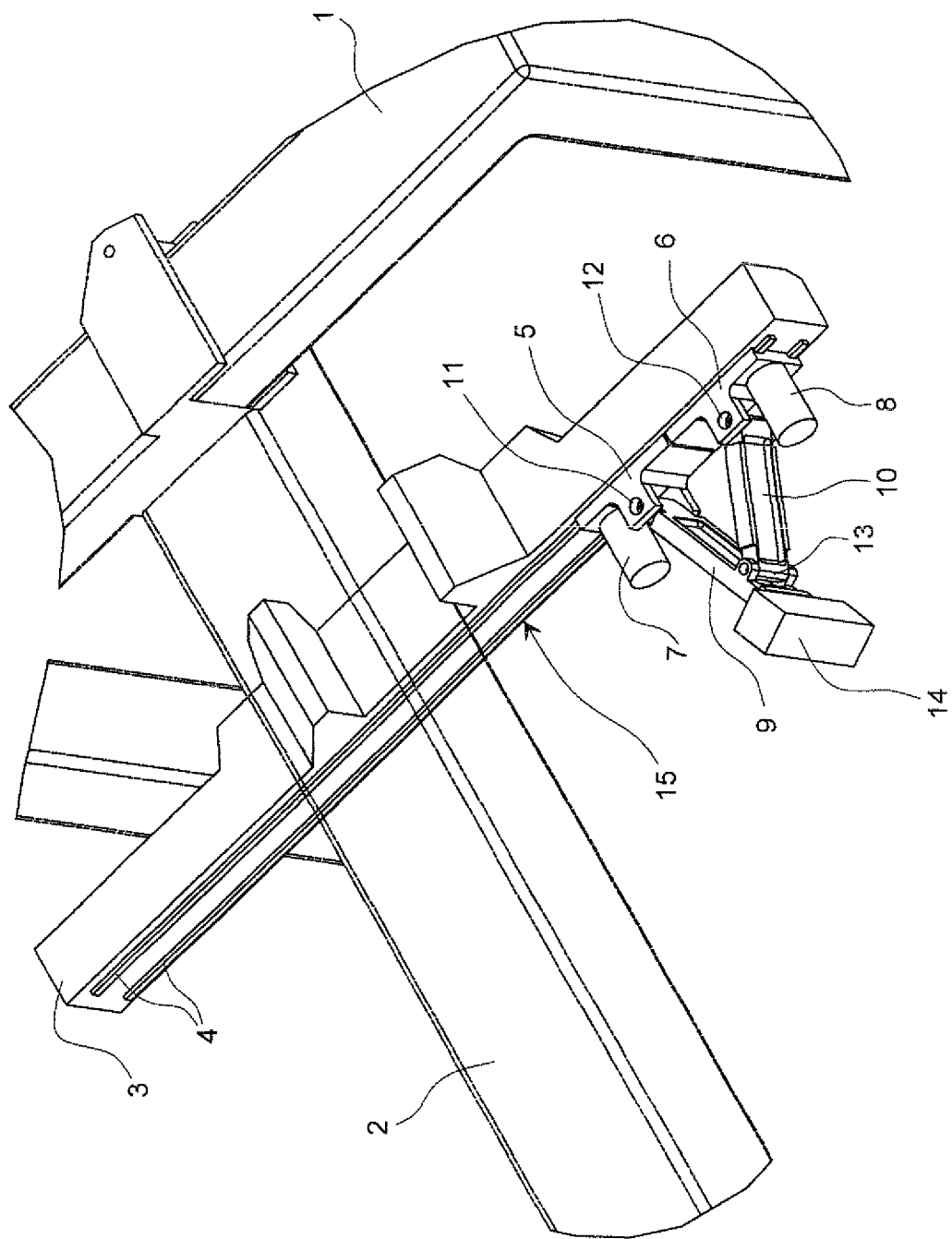
FIG. 3 shows the enlarged detail of the manipulator in a position of minimum mutual distance at the same end of axis Y.
Figure 4:
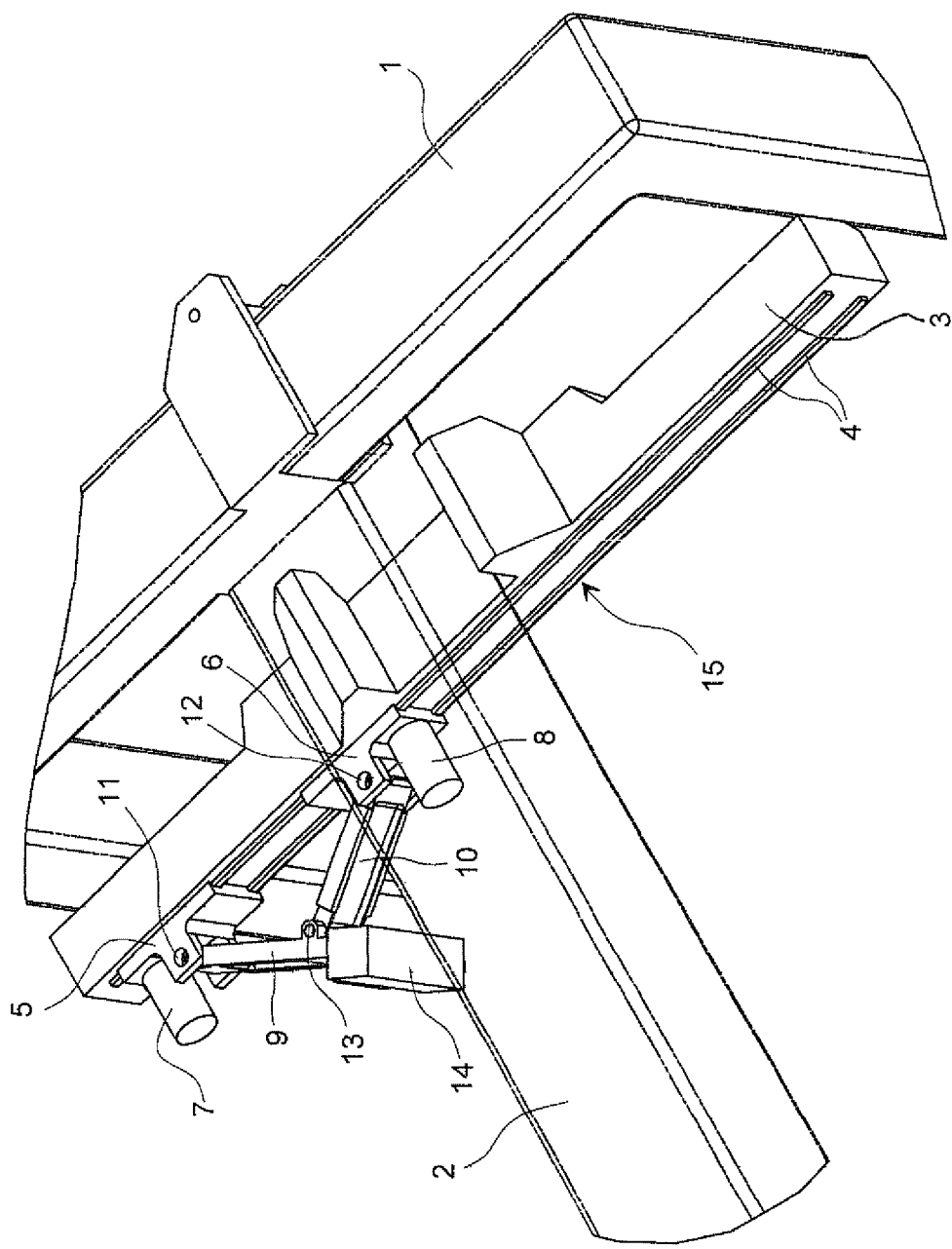
FIG. 4 shows the enlarged detail of the manipulator in a position of maximum mutual distance at the other end of axis Y.
Figure 5:
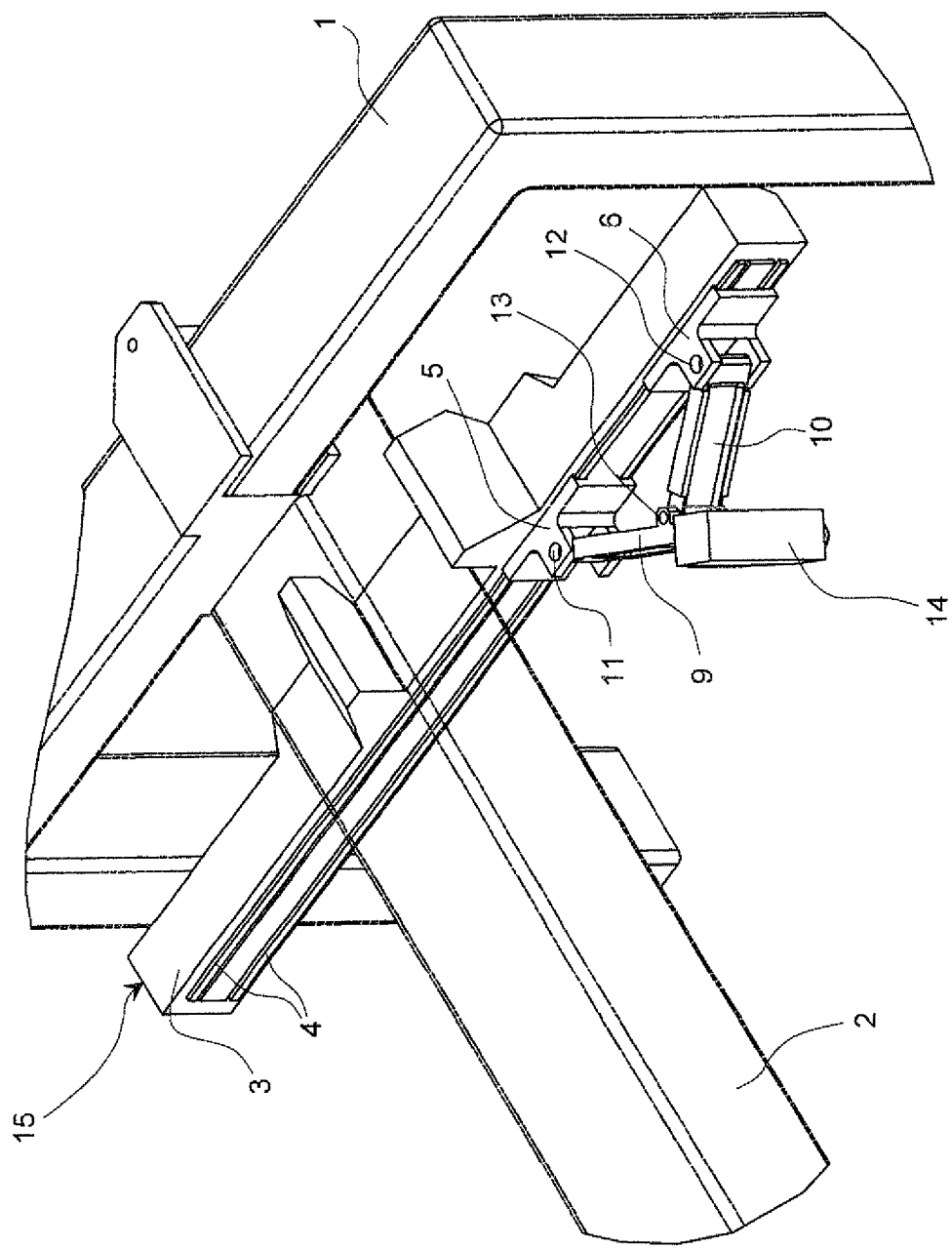
FIGS. 5 and 6, in the position in FIG. 2, show respective variants of manipulator with actuators of different type.
Figure 6:
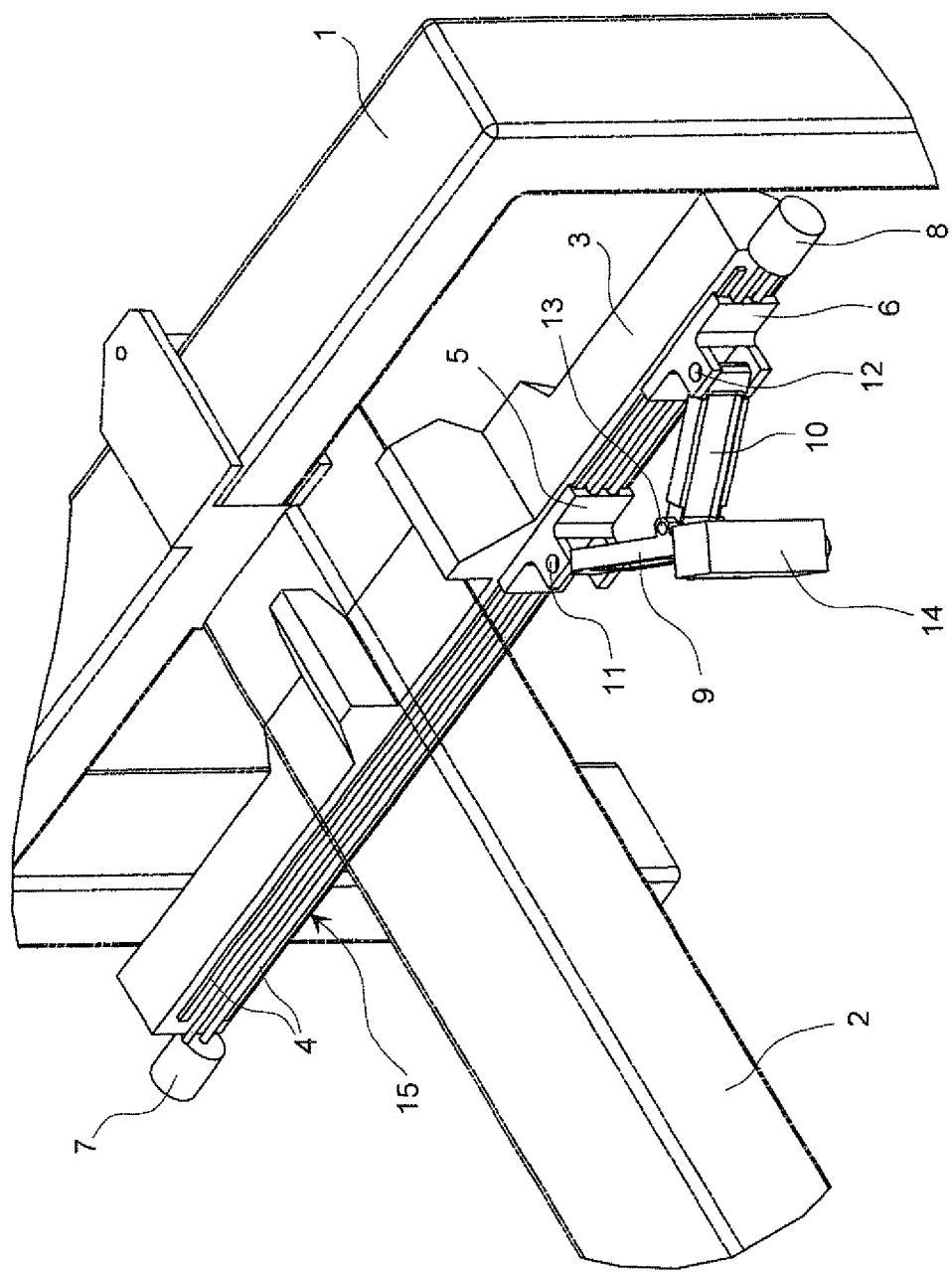

Along the crossbeam 3, which defines an axis Y parallel to the plane of the sheet (not shown), two sliding blocks 5 and 6 may slide at a variable mutual distance along guides 4, the sliding blocks being moved by respective independent actuators 7 and 8 which may be of the pinion-rack drive type (FIGS. 2-4) or may have a slide with linear motors (FIG. 5, where the motors have been actually omitted to simplify the drawing) or again a leadscrew with recirculating balls (FIG. 6).

An articulated system having two rods 9 and 10 arranged as a V, which have respective ends hinged on respective sliding blocks 5 and 6 through pivots 11 and 12 with axes perpendicular to the plane of the sheet metal and with each other through a further pivot 13, also with axis perpendicular to the plane of the sheet metal, arranged near the other end of the rod 9, supports a laser cutting head (focusing head) 14 which is integrally fixed to said other end of the rod 9. The head 14 performs the cut on the sheet metal placed on a horizontal plane beneath the longitudinal beam 2 and the crossbeam 3.

The assembly consisting of crossbeam 3, sliding blocks 5 and 6, actuators 7 and 8 and articulated rods 9 and 10 is a moving equipment 15 which determines the desired movements of the laser cutting head 14 along the cutting profile required.

Rare wide movements are performed along axis X defined by the longitudinal beam 2 and local, frequent movements are performed along the axes YΘ, defined by the movement of the sliding blocks 5 and 6 along the crossbeam Y and by the fact of mutually moving close and away to/from each other due to the different motion imparted by the independent actuators 7 and 8 to the sliding blocks themselves. The first one of these provides the transversal mobility, while the second one adds an angular mobility having a constant radius. The combination of the two motions offers the local Cartesian coverage required.

The auxiliary system consisting of sliding blocks 5 and 6, actuators 7 and 8 and articulated rods 9 and 10 is a moving assembly at low inertia which allows to perform highly accurate cuts having high dynamics, thus increasing the work performances of the machine and ensuring a high sheet metal cutting quality.

The invention claimed is:

1. Manipulator at low inertia for laser cutting machines for flat sheet metals, comprising a longitudinal movement axis X and a transversal movement axis Y perpendicular to said longitudinal axis and parallel to the plane of the sheet metal, and a supporting equipment (15) for a laser cutting head (14) which is displeaceable along said axes, characterized in that said supporting equipment (15) comprises two sliding blocks (5, 6) driven by respective independent actuators (7, 8) to move along the axis Y at a variable mutual distance, and two rods (9, 10) arranged as a V for the articulated connection of said sliding blocks (5, 6) to said laser cutting head (14), a first rod (9) having a first end hinged on a first sliding block (5) so as to be rotatable around a first axis (11) perpendicular to the plane of the sheet metal and a second end integrally fixed to said head (14) and a second rod (10) having a first end hinged on a second sliding block (6) so as to be rotatable around a second axis (12) perpendicular to the plane of the sheet metal and a second end hinged on said second end of the first rod (9) so as to be rotatable around a third axis (13) perpendicular to the plane of the sheet metal.

2. Manipulator according to claim 1, characterized in that said actuators (7, 8) are of the type with linear motor.

3. Manipulator according to claim 1, characterized in that said actuators (7, 8) are of the screw type.

4. Manipulator at low inertia for laser cutting machines for flat sheet metals, comprising a longitudinal movement axis X and a transversal movement axis Y perpendicular to said longitudinal axis and parallel to the plane of the sheet metal, and a supporting equipment (15) for a laser cutting head (14) which is displeaceable along said axes, characterized in that said supporting equipment (15) comprises two sliding blocks (5, 6) driven by respective independent actuators (7, 8) to move along the axis Y at a variable mutual distance, and two rods (9, 10) arranged as a V for the articulated connection of said sliding blocks (5, 6) to said laser cutting head (14), a first rod (9) having a first end hinged on a first sliding block (5) so as to be rotatable around a first axis (11) perpendicular to the plane of the sheet metal and a second end integrally fixed to said head (14) and a second rod (10) having a first end hinged on a second sliding block (6) so as to be rotatable around a second axis (12) perpendicular to the plane of the sheet metal and a second end hinged on said second end of the first rod (9) so as to be rotatable around a third axis (13) perpendicular to the plane of the sheet metal wherein said actuators (7, 8) are of the type with pinion and rack.

\* \* \* \* \*